United States Patent Office.

JOSHUA J. GREEN, OF JACKSON, MISSISSIPPI.

REMOVING FIBER FROM COTTON-SEED.

SPECIFICATION forming part of Letters Patent No. 299,378, dated May 27, 1884.

Application filed March 12, 1884. (No specimens.)

*To all whom it may concern:*

Be it known that I, JOSHUA J. GREEN, of Jackson, in the State of Mississippi, have invented certain new and useful Improvements in the Art of Cleaning Cotton-Seed, of which the following is a specification.

The object of my invention is to remove the lint from cotton-seed. Attempts more or less successful have heretofore been made to accomplish this result, the means proposed being sometimes mechanical, sometimes chemical, and sometimes a mixture of both. My invention is based mainly upon chemical action, the agent employed for the purpose being sulphuric acid.

I am aware that the treatment of cotton and other seed or grain by sulphuric acid is not new. My invention resides in the special mode of procedure employed by me, the object being to clean the cotton-seed thoroughly with much less expenditure of acid and consequent loss than has heretofore been the case. I use the acid in very dilute state, and, with a view to still further reduce the expense, I use but a comparatively small quantity of this dilute acid, ordinarily only about enough to moisten the whole mass of seed when the two are thoroughly stirred together. The acid in this condition is effective in itself to carbonize the lint. I find, however, that it can be made efficient by heating the seed, and then sprinkling the same with water while thus heated. Under these conditions the lint is thoroughly carbonized in a very short time, and all that remains to do is to wash the seed with water, which results in freeing them from the carbonized lint and the acid, and then to dry them.

To enable others to better understand and practice my invention, I shall proceed to describe the best way now known to me of carrying it into effect.

I find that excellent results are obtained by using sulphuric acid in the proportion of, say, fifty pounds of acid of 66° Baumé to the ton of seed. This acid I dilute to, say, 10° to 15° Baumé, or even lower. The seed to be cleaned is put into a heater of any suitable kind, which should be provided with a stirrer, for the purpose of agitating the seed, so as to insure as far as possible thorough intermixture of the acid and seed, and the dilute acid is added in the proportion above given. The heater which in practice I employ is a jacketed upright cylinder, with a top movable to permit the seed and acid to be introduced, and with a gate or door in the bottom for the discharge of the seed after treatment. Steam is introduced into the jacket in the usual way, and I ordinarily employ steam at from, say, sixty to eighty pounds pressure, which insures the thorough and speedy heating of the seed. The seed are introduced into the heater, the dilute acid is added in proper proportion, being sprinkled upon the mass of seed by discharging it through a rose or some equivalent device, the top of the heater is closed, and the stirrer is put in motion to agitate the seed and to distribute the acid evenly through the mass. The seed are hardly more than moistened by the dilute acid, and the heat tends to evaporate the moisture, so that by the time the seed are well heated, which usually takes about three minutes, they are but little moist. Keeping the seed still in motion, I now sprinkle the heated mass well with water discharged upon it from a rose. The effect is instantaneous; the carbonizing of the lint at once sets in, and is completed so rapidly that at the expiration of from two to three minutes more the seed are in condition to be discharged or removed from the heater. After their removal I wash them well in water, which has the effect of separating from them the acid and the burnt lint, and I then dry them.

In the form of apparatus which I at present prefer to use in carrying out my invention a conveyer, consisting of a feed-screw revolving in a trough or tubular conduit, is arranged under the discharge-door in the heater. When the door is opened, the seed, which are swept around by the arms of the stirrer, are brought to the opening and drop through it into the conveyer, by which they are carried off. The bottom of the conveyer trough or tube is finely perforated or made of wire screening of a mesh too fine to permit the seed to pass through. At suitable points in the conveyer-tube throughout its length I introduce nozzles, from which water under pressure is forcibly injected into the mass of seed as it is fed along by the feed-screw. The result is that the acid and burnt lint are washed from the seed and pass off with the water through the reticulated bottom of the conveyer, while the cleansed seed are discharged from the conveyer.

I here remark that I do not claim the apparatus above described as of my invention. Under this mode of procedure the quantity of acid required is so small that no steps need be taken to recover it, but it can be allowed to go to waste, the loss being but trifling. The operation, moreover, is very rapid, but about five minutes being required for the acid treatment, three of which are consumed in heating the mass and in intermingling the acid with the seed, and the other two of which are required for the addition of water, and the resultant complete burning of all the lint. These results are attributable mainly to the heating, without which the dilute acid is not effective, as well as to the addition of the water, without which, so far as my experience goes, thorough and complete burning of the lint throughout the mass cannot be had.

It will of course be understood that while in illustration of my invention I have described one form of apparatus with which the process can be worked, yet I am not restricted to that special form, but may use any that may be found convenient or suitable for the purpose. Nor do I restrict myself to the precise proportions of ingredients hereinbefore stated.

What I consider to be new and of my invention is—

The described improvement in the art of removing lint from cotton seed, consisting in subjecting the seed to the action of dilute sulphuric acid and heat, adding water to the heated mass to complete the carbonizing operation, and subsequently washing the seed free from the acid and burnt lint, all substantially as hereinbefore set forth.

In testimony whereof I have hereunto set my hand this 11th day of March, A. D. 1884.

JOSHUA J. GREEN.

Witnesses:
EWELL A. DICK,
J. WALTER BLANDFORD.